United States Patent [19]

Trema

[11] Patent Number: 4,805,717
[45] Date of Patent: Feb. 21, 1989

[54] BRACKET CONSTRUCTION FOR A MOTOR CYCLE ASSEMBLY

[75] Inventor: Daniel Trema, Bezons, France

[73] Assignee: ELF FRANCE, Courbevoie, France

[21] Appl. No.: 31,997

[22] Filed: Mar. 27, 1987

[30] Foreign Application Priority Data

Apr. 1, 1986 [FR] France ................ 86 04602

[51] Int. Cl.4 ................ B62K 25/16; B62K 25/20
[52] U.S. Cl. ................ 180/219; 180/225;
180/227; 280/277; 280/285
[58] Field of Search ............... 180/219, 220, 221, 222,
180/223, 224, 225, 227, 228, 229; 280/270, 277,
281 B, 285, 275

[56] References Cited

U.S. PATENT DOCUMENTS

| | | | |
|---|---|---|---|
| 3,521,904 | 7/1970 | Sheffer | 180/219 X |
| 4,226,296 | 10/1980 | Higaki | 180/219 |
| 4,265,329 | 5/1981 | de Cortanze | 280/275 X |
| 4,347,909 | 9/1982 | Takemura et al. | 180/225 X |
| 4,550,794 | 11/1985 | Inoue et al. | 180/219 |
| 4,638,881 | 1/1987 | Morioka et al. | 180/219 |
| 4,650,027 | 3/1987 | de Cortanze | 180/227 |
| 4,678,054 | 7/1987 | Honda et al. | 180/225 |
| 4,721,179 | 1/1988 | Yamaguchi et al. | 280/275 X |

FOREIGN PATENT DOCUMENTS

| | | | |
|---|---|---|---|
| 918188 | 9/1954 | Fed. Rep. of Germany | 180/219 |
| 2332169 | 7/1977 | France | 180/227 |
| 19485 | of 1907 | United Kingdom | 180/225 |
| 330309 | 6/1930 | United Kingdom | 180/219 |

Primary Examiner—David M. Mitchell
Assistant Examiner—Charles R. Watts
Attorney, Agent, or Firm—Burgess, Ryan & Wayne

[57] ABSTRACT

Bracket construction of the motor-transmission assembly of a motorcycle comprising at least one front axle assembly and at least one rear axle assembly, wherein at least one connecting element operating under tensile stresses connects the means for securing the front and rear axle by assemblies, thus displacing downwards the neutral zone of bending of the engine assembly, this invention being applied to a motorcycle with a standard motor block working operating in a bending condition.

4 Claims, 1 Drawing Sheet

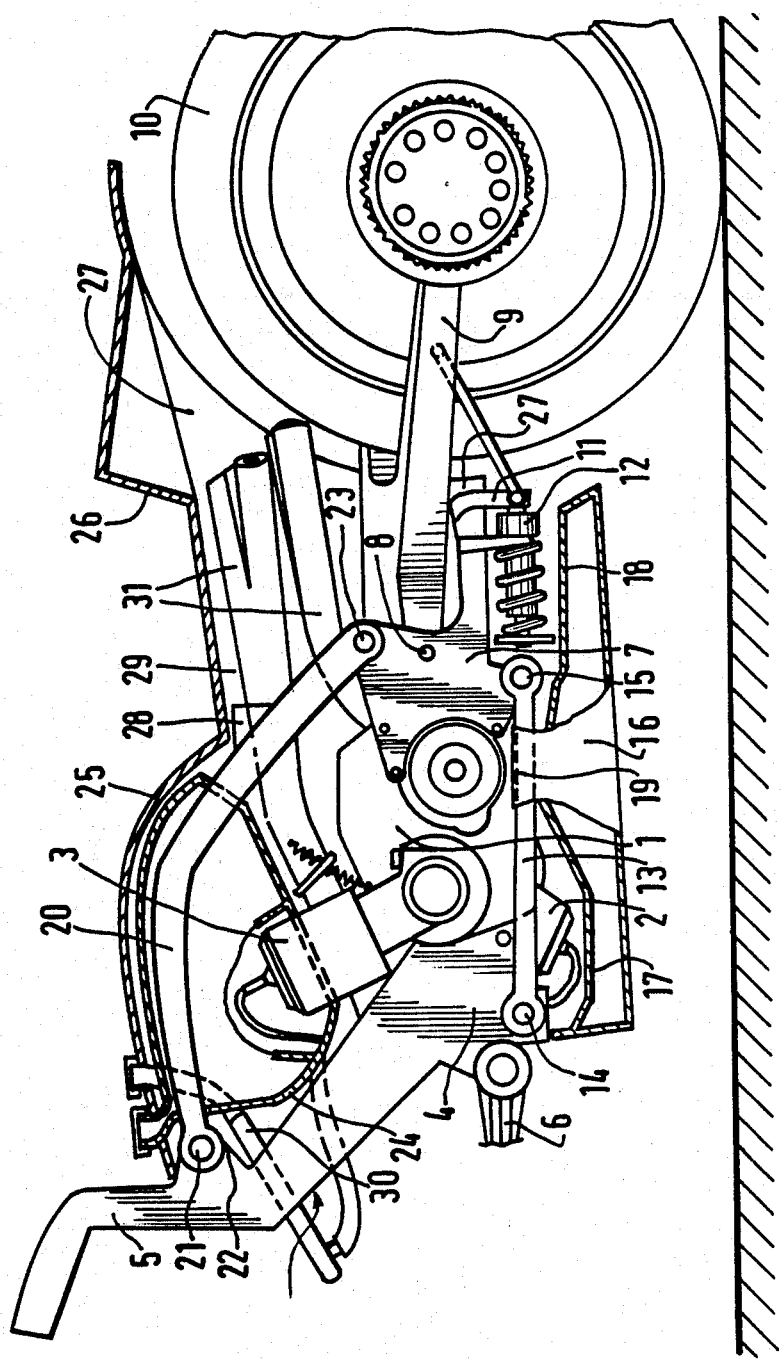

BRACKET CONSTRUCTION FOR A MOTOR CYCLE ASSEMBLY

FIELD OF THE INVENTION

Background of the invention

The present invention concerns a bracket construction for an engine assembly for a motorcycle, which comprises at least one front axle assembly and at least one rear axle assembly, each constituted by a wheel, a suspension, a steering means, and securing means for securing to the engine, the engine assembly being mainly constituted by the motor block and transmission devices.

Motorcycles generally comprise for supporting an engine transmission block a frame upon which is secured this block and which is connected, on the one hand, to a front axle assembly comprising the front wheel and its steering as well as the rear suspension, and on the other hand, to a rear axle assembly and the rear suspension.

In order to lighten this design and to utilize the inherent resistance of the engine transmission block that thus acts as a longitudinal beam, it has already been proposed to equip the motor block with lateral plates to which are hingedly connected respective suspension and guiding arms of the front and the rear wheels, as well as possibly a front strut forming the steering head.

This self-carrying combination of transmission-engine block allows to considerably lighten the motorcycle and even to reduce manufacturing costs when it is utilized to produce a standard motor block motorcycle. Nevertheless, known motorcycles utilizing this design develop during service excessive stresses, especially tensile stresses, in the engine transmission block of which the case thus finishes by breaking under the effect of wear upon the metal of which it is constituted, through excessive alternated stresses provoked by the front axle and/or rear axle assemblies during driving of the engine cycle.

Furthermore, with this design of carried engine block submitted to flexing stresses removal of the engine proves delicate since, after setting out the engine from the motor block, the motorcycle that no longer has a frame has its front and rear axle assemblies separated and only exists as geometric receiving reference of the engine. There is thus a need in the field of motorcycle construction for a chassis or support structure system for the engine-transmission block of a motorcycle that would allow this motorcycle to preserve its unity and its stability after removal of the engine-transmission block for repairs or exchange and which could nevertheless utilize the stiffness and great capacity of resistance to flexing of the engine-transmission block with the aim of reducing the weight of the motorcycle.

With this purpose, according to the invention at least one connecting element operating under tensile stresses connects the securing means of the front and rear axle assemblies, thus displacing downwards the neutral zone of flexing of the engine assembly.

According to a practical embodiment of the invention, the connecting element is directly connected to at least one member acting to secure the securing means of the front or rear axle assemblies to the engine assembly. The securing means of the axle assemblies are constituted by at least one front axle assembly securing means and at least one rear axle assembly securing means, secured to the engine assembly and connected to at least one connecting element operating under tensile stresses.

According to another advantageous embodiment of the invention, the connecting elements comprise at least one element laterally disposed and two connecting elements can thus be disposed on either side of the engine assembly.

The connecting elements advantageously comprise at least one support element withstanding the tensile stresses over the whole or part of the width of the engine assembly.

According to another embodiment of the invention, at least one of the connecting elements is inserted within or is in contact with a streamlining or fairing element and/or a tank of the motorcycle.

The bracket construction according to the invention can comprise at least one upper carrier element carrying forward onto the securing means of the front and rear axle assemblies the loads placed in the upper portion of the motorcycle.

The upper element can be cambered piece extending over the engine assembly or at least partially inserted within the fairing of the motorcycle or with in the upper tank of the motorcycle. The upper element can form a removable shell used as a seat for the rider and/or passenger of the motorcycle.

According to another embodiment of the invention, at least one portion of the removable shell encases at least partially the engine assembly and forms around the engine block a passage having a generally annular form which ensures the guiding and the flow of the cooling air and in which can be advantageously disposed a cooling radiator.

BRIEF DESCRIPTION OF THE DRAWING

Other aims advantages and objects will become apparent from the following description of an embodiment of the invention, given by way of non-limitative example with reference to the appended drawing in which the single FIG. 1 represents schematically, in a lateral view, with lateral torn away parts on the tanks and the support plates, a bracket construction for an engine-transmission block of a motorcycle, where only the rear axle of which is partially represented.

DESCRIPTION OF A PREFERRED EMBODIMENT

FIG. 1 shows the motorcycle comprising an engine-transmission block 1 with several cylinders of which two cylinders referenced 2 and 3 are visible and which is constituted of several cast parts assembled forming a longitudinal beam that withstands moments and stresses.

At its front end, the motor block 1 is provided, preferably by pressing by means of screws, on each side, with a stiff securing plate 4, for example made of sheet metal or aluminum alloy, which is extended upwards by a sort of steering head or strut 5 intended to receive and support the steering and handle-bars of the motorcycle. On the securing plates 4 is hinged at least one front suspension arm 6 which supports the front wheel (not represented) of the motorcycle, which wheel is also connected to the strut 5 through the means of a mechanical suspension and steering system.

At its rear end, the motor block 1 carries (also through pressing by means of screws) on each side, a rear plate 7 made of sheet metal to which is connected by a hinging axis 8 a drawn support arm 9 of the rear wheel 10 of the motorcycle. The rear suspension of the motorcycle on the arm 9 is obtained here by a connecting rigging 11 and a spring-shockabsorber block 12 which is housed underneath the rear portion of the motor block 1.

In order to reduce the tensile stresses during service to which the motor block 1 is subjected, a connecting element connects the front and rear plates 4, 7 by their low portions. This connecting element is here made of two rigid rods or draw bars 13, each of which is disposed on a different side of the motor block 1 and hingedly connects the bottom of the front plate 4 to the bottom of the rear plate 7. The connection with the rear plate and front plate is carried out in a very simple way by causing each of the hinging heads provided at the end of the rod 13 to be crossed through by one of the pressing screws 14 of the front plate 4 and respectively 15 of the rear plate 7 on the block engine 1. Each rod 13 is thus tightened by screws 14 and 15 on plates 4 and 7 and hingedly connected by these screws to motor block 1.

The external case of the motor block 1, constituted by several cast parts assembled by screws, forms a longitudinal beam that is subjected to flexing stresses provoked by the action of gravity upon the engine and transmission members carried by this case and through the action of accelerations and decelerations, shocks and rotations, provoked by the running of the motorcycle and the movements of its suspension, as well as by the pressure of the combustion gases which always tend to increase the tensile stresses rather than the compressed ones. The motor block case is generally made of aluminum alloy presenting a relatively high elasticity modulus authorizing a considerable bending deflection. On the other hand, the lateral rods 13 constituting a connecting element working under tensile stresses, due to their position adjacent to that of the external fiber of the hollow beam constituted by the case of the motor block 1, are generally made of steel (or exceptionally of titanum) presenting a much higher elasticity modulus and therefore a greater stiffness against tensile stresses than the case of the motor block. This means that the neutral fiber in bending, i.e. the zone where no or only slight tensile stresses or compression stresses are exerted during bending, is displaced towards the bottom of the beam of the case of the motor block and the tensile stresses provoked by the bending are reduced, the greatest tensile force under bending being supported between the front plates and rear plates 4, 7 by the resistant lateral rods 13.

The rods forming draw-bars and being subjected to high stresses only in tensile stresses, can have a relatively low inertia moment and do not risk buckling. It is also possible to produce them not only in the form of a small-diameter circular rod but also in the form of a thin and elongated plate the heads of which are bored for the passage of screws 14 and 15 and which match the form of the sides of the motor block 1. Another advantage of utilizing rods 13 for strengthening the motor block 1 and reducing tensile stresses supported by this block is due to the fact that it is easy to replace the rods 13 by equivalent pieces of another form or by rods that are more resistant or lighter, in function of the results observed in service on the motorcycle, which is absolutely not the case with a motorcycle case.

It can also be noted that the connecting element constituted by two low rods 13 (or more than two pushrods where necessary) can be replaced by a single flat element, made of sheet metal for example which matches the shape of the low portion of the case of the motor block 1 and which, attached at several points of the front and rear plates 4, 7 and/or of the motor block 1, distributes the tensile forces over the whole width of the motor block.

According to a particular embodiment represented on the Figure, the lateral rods 13 are incorporated in a low fuel tank 16 which presents a transverse section in the general form of a hemicylinder in order to allow steep banking of the motorcycle on cornering and the top portion of which matches, while leaving a ventilation gap, the form of the low portion of the motor block 1 (wall 17 encasing the cyclinder 2 while leaving a cooling passage) and of the rear suspension (wall 18 encasing the spring-shock-absorber block 12 while leaving it for alternate movements. The fuel tank 16 is thus supported along a great portion of its length and on each side, by a resistant piece and which transmits forwards the weight of the tank directly on the end plates 4 and 7. The tank 16 generally made of flexible material plastic, can incorporate rods 13 by molding or these rods can be introduced into the passages provided inside an edge or a lateral fold 19 of this tank. It will be noted that the tank 16 constitutes, for the lower part of motor block 1, a fairing that leaves free an interval for the circulation of air around this lower part.

According to another embodiment of the invention, the connecting element between the front and the rear plates 4, 7 of the motor block 1 comprise, on each side, an upper element constituted here by a cambered piece in the form of a rod 20 hinged in 21 at its front end to a nose piece 22 of the strut 5 of the front plates 4. The rods 20 that must resist to compression and buckling possess an elasticity modulus higher than the low rods 13 and are pivoted in 23 at their rear end to the top part of the rear plate 7.

The high rods 20 can reduce the compression stresses to which the motor block 1 is subjected but this reduction only presenting a limited interest, they especially act to trasnmit onto the front 4 and rear 7 securing plates the loads that are applied to the high part of the motorcycle. Among these loads, can be cited possibly a high fuel tank 24 placed above the top cylinders of the engine in a zone crossed through by a stream of cooling air, and especially the upper fairing 25 of the motorcycle which acts as a seat for the rider and supports the entire weight of the driver and possible his passenger. The upper fuel tank 24 is supported by upper rods 20 in the same way as tank 16 by rods 13, i.e. at its top part.

The upper fairing 25 of the motorcycle forms a detachable shell encasing the motor block 1 and which acts as rest for the rider (and possibly his passenger) through the means of a shoulder 26 in the form of a seat. The upper fairing 25 is connected to the motor block 1 at several hooking points (not represented) by means of its lateral faces 27 and it bears directly on the rods 20 through the intermediary of a bearing edge 28 having a substantially horizontal upper surface provided on the upper surface of these rods 20.

The removable shell constituted by the fairing 25 encases the engine assembly 1 by forming around it a passage 29 having a generally annular form (exactly in the form of an oval half-ring) that ensure the guiding of the cooling air of the engine circulated by the natural displacement of the motorcycle, this circulated air being able to be activated, especially at stop, by an axial ventilator (not represented). A water cooling and/or oil radiator 30 can be disposed to the front of the passage 29 in order to benefit from the circulation of the air activated by the displacement of the motorcycle. It will be noted that, in a diposition convenient for high-speed motorcycles, the radiator 30 is disposed very steeply inclined with respect to the direction of displacement of the motorcycle, which allows to increase its frontal surface that constitutes the determinant element of its cooling capacity. The rear of the passage 29 encases the exhaust pipes 31 of the cylinders of the engine by constituting for these pipes a ventilated sleeve which partially ensures their thermal and sound insulation. The exhaust pipes 31 are, of course, extended towards the rear above the rear wheel 10 according to one embodiment (not represented).

According to one particular embodiment of the bracket for the engine assembly according to the invention, the front and rear plates 4, 7 can be replaced by a single lateral plate which combines the two plates and which is, for example, constituted by a cast part and which is attached by screws at several points on the motor block 1. In this disposition, which does not present any particular resistance to tensile forces due to the fact of utilizing lateral cast parts, the low rods 13 constitute a very efficient element for increasing the resistance to tensile stresses.

The operating of the support device of the engine assembly of the motorcycle which is explained hereinabove can be understood from the description hereinabove for the characteristic phases of its operation.

The motor block 1 is encased in service in a bracket construction forming the chassis or cradle and constituted by front 4 and rear 7 plates connected by rods 13 at their low parts against tensile forces. The mode assembly of the engine cradle 1 is closed towards the top by rods 20 which practically limit the stresses in service to those provoked by the combustion pressure of the cylinders 2 and 3.

When it is necessary to remove the engine of the motorcycle, firstly the fairing 25 is removed, and then the upper tank 24 and the rods 20. Thereafter, from the motor block 1 are removed the plates 4 and 7 and the rods 13, for final removal of the engine block which is removed laterally or from above. The motorcycle is simply reconstituted thereafter without its engine-transmission block, by replacing the rods 13 in order to connect the front and rear plates 4 and 7, where necessary with wedging sleeves allowing to tighten screws 14 and 15. Through the provisions according to the invention, the motorcycle does not require to be dismantled into two rear and front axle assemblies when the engine is removed and the fitting of the engine as well as repairs of the other components of the motorcycle is thus facilitated.

It is of course well understood that the present invention is in no way limited to the embodiments described and represented, and it can be adapted to numerous variants available to those skilled in the art, without departing from the scope and spirit of the said invention.

I claim:

1. An engine and transmission assembly of a motorcycle of the type including a front axle assembly, said assembly comprising:
    a motor;
    case means forming a longitudinal hollow beam made of assembled cast parts for supporting the motor;
    a transmission gear contained in said case means;
    said assembly comprising on each longitudinal side of said motorcycle;
    a stiff front plate secured by screw elements to said engine and transmission assembly and connected to said front axle assembly and including upper and lower portions;
    having a front wheel, a front wheel suspension and steering means for steering said front wheel;
    a stiff rear plate secured by screw elements to said engine and transmission assembly and connected to said rear axle assembly and including upper and lower portions;
    a rear axle assembly having a rear wheel, a rear wheel suspension and drive means for driving said rear wheel; and means for connecting said front and rear axle assemblies to said engine and transmission assembly;
    at least one draw bar, each draw bar having opposite ends with a hinging head at each end that is crossed through by one of the screw elements respectively securing the front and the rear plates, each end of each draw bar that is crossed through by a screw element being connected to the lower portion of the respective front and rear plates, so that the neutral axis, during bending, of said longitudinal hollow beam is displaced downwardly relative to the said beam to reduce bending tensile stresses on said hollow beam which is subjected to various other tensile stresses including those due to the pressure of combustion gases.

2. An assembly according to claim 1, wherein said at least one draw bar is made of a single flat metal sheet element which matches the external low portion of the hollow beam and is secured at several points of said low portion for withstanding tensile forces over the entire width of the said engine and transmission assembly.

3. An assembly according to claim 1, wherein the at least one draw bar is inserted in an element that is removably secured to the hollow beam by the through crossing screw elements.

4. An assembly according to claim 1, wherein said motorcycle includes an engine block and further comprising at least one upper carrier rod connected between said front and rear plates and transmitting at least part of a load placed on an upper part of the motorcycle to said front and rear plates, each said upper carrier rod having a cambered form extending over the engine assembly, wherein each upper carrier rod bears a removable shell acting as a seat for a rider or passenger of the motorcycle and at least partially encasing the engine and transmission assembly and forming around the engine block a passage having a generally annular form to ensure guiding of cooling air.

* * * * *